(12) United States Patent
Miller, Jr. et al.

(10) Patent No.: US 8,886,937 B2
(45) Date of Patent: Nov. 11, 2014

(54) PCI DSS COMPLIANT PROXY SERVICE

(75) Inventors: Henry S. Miller, Jr., Columbus, OH (US); Michael R. Fleet, Columbus, OH (US); Brian J. Celenza, Loveland, OH (US); Daniel Shust, Painesville, OH (US)

(73) Assignee: Resource Interactive, LLC, Columbus, OH (US)

( * ) Notice: Subject to any disclaimer, the term of this patent is extended or adjusted under 35 U.S.C. 154(b) by 4 days.

(21) Appl. No.: 13/417,883

(22) Filed: Mar. 12, 2012

(65) Prior Publication Data

US 2012/0233464 A1    Sep. 13, 2012

Related U.S. Application Data

(60) Provisional application No. 61/451,915, filed on Mar. 11, 2011.

(51) Int. Cl.
| | |
|---|---|
| *H04L 9/32* | (2006.01) |
| *G09B 5/08* | (2006.01) |
| *H04L 29/06* | (2006.01) |
| *G06Q 30/06* | (2012.01) |
| *G09B 5/06* | (2006.01) |

(52) U.S. Cl.
CPC .... *G06Q 30/0601* (2013.01); *G06F 2221/2107* (2013.01); *G09B 5/08* (2013.01); *H04L 63/0428* (2013.01); *H04L 63/168* (2013.01); *G06F 2221/2119* (2013.01); *H04L 63/0471* (2013.01); *G09B 5/06* (2013.01)
USPC .......................................................... 713/168

(58) Field of Classification Search
CPC ... H04L 67/20; H04L 2463/101; G06Q 30/00
USPC .......................................................... 713/168
See application file for complete search history.

(56) References Cited

U.S. PATENT DOCUMENTS

| | | | |
|---|---|---|---|
| 8,392,561 B1 * | 3/2013 | Dyer et al. ..................... 709/225 |
| 2006/0265335 A1 * | 11/2006 | Hogan et al. ..................... 705/65 |
| 2007/0150348 A1 * | 6/2007 | Hussain et al. ................. 705/14 |
| 2007/0180230 A1 | 8/2007 | Cortez | |
| 2007/0295803 A1 | 12/2007 | Levine et al. | |
| 2010/0030697 A1 | 2/2010 | Goodrich et al. | |
| 2010/0191602 A1 | 7/2010 | Mikkelsen et al. | |

OTHER PUBLICATIONS

Young, Lee W. Notification of Transmittal of the International Search Report and the Written Opinion of the International Searching Authority, or the Declaration, issued May 31, 2012.

* cited by examiner

*Primary Examiner* — Arvin Eskandarnia
(74) *Attorney, Agent, or Firm* — Kegler Brown Hill & Ritter; James J. Pingor

(57) ABSTRACT

The innovation includes systems and methods of facilitating electronic commerce (e-commerce) via a proxy service. Such a method can include the acts of receiving a hypertext transfer protocol with secure socket layer (HTTPS) request from a client application and translating the HTTPS request to a format appropriate for an e-commerce web application. Additionally, such a method can include the steps of sending the translated request to the e-commerce web application via HTTPS and receiving a response based at least in part on the translated HTTPS request. The method can also include the acts of translating the HTTPS response to a format appropriate for the client application and sending the translated response to the client application via HTTPS. Secure information can be encrypted and stored at the client application separately from the encryption key, which can be stored by the proxy service.

20 Claims, 8 Drawing Sheets

PCI DSS COMPLIANT PROXY SERVICE

CROSS-REFERENCE TO RELATED APPLICATIONS

This application claims the benefit of U.S. Provisional Patent application Ser. No. 61/451,915 entitled 'PCI DSS COMPLIANT PROXY SERVICE' and filed Mar. 11, 2011. The entirety of the above-noted application is incorporated by reference herein.

TECHNICAL FIELD

The subject innovation relates to securely transporting information to and from an electronic commerce system.

BACKGROUND

As product purchases and monetary exchanges continue to emerge via the Internet, regulations have been enacted to control how these transactions are consummated. Generally, Internet transactions are referred to as electronic commerce or "e-commerce" transactions, which refers to the act of buying and selling products and services via electronic systems, such as the Internet.

There has been explosive growth in the use of the Internet as a medium for facilitating online ordering and purchasing. However, in most merchant cases, the effort to build a single e-Commerce Web Application to service multiple consumer driven applications can be overwhelming. In most situations, a merchant has to build multiple e-Commerce Web Applications either acting as individual fulfillment systems or independently connecting to a single fulfillment system.

With continued popularity and ease of these e-commerce transactions, the amount of trade conducted electronically has grown extraordinarily as Internet usage becomes commonplace in today's society. A large percentage of electronic commerce is conducted entirely electronically, e.g., for items such as bill payment, money transfers, service purchases, etc. However, many e-commerce transactions involve transportation of physical items following an on-line purchase.

Along with the emergence of e-commerce is a need for regulation to govern these types of transactions. The Payment Card Industry Data Security Standard (PCI DSS) is a worldwide information security standard defined by the Payment Card Industry Security Standards Council. The standard increases controls related to e-commerce data in an attempt to prevent credit card fraud and other malicious attacks. The standard applies to all organizations that hold, process, or exchange cardholder information from any card branded with the logo of one of the card brands.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The subject innovation, in one aspect thereof can comprise a method of facilitating electronic commerce (e-commerce). Such a method can include the acts of receiving a hypertext transfer protocol with secure socket layer (HTTPS) request from a client application and translating the HTTPS request to a format appropriate for an e-commerce web application. Additionally, such a method can include the steps of sending the translated request to the e-commerce web application via HTTPS and receiving a response based at least in part on the translated HTTPS request. The method can also include the acts of translating the HTTPS response to a format appropriate for the client application and sending the translated response to the client application via HTTPS.

In other aspects, the subject innovation can comprise an e-commerce management system. Such a system can include a proxy service component that can provide for secure communication between a client application and an e-commerce web application. The proxy service component can include a client interface component that can receive a request from the client application and an e-commerce interface component that can translate the request to a format appropriate for the e-commerce web application, send the translated request to the e-commerce web application, and receive a response from the e-commerce web application. The client interface component can also translate the response to a format appropriate for the client application and send the translated response to the client application. The system can also include a proxy service data store that can store non-sensitive information associated with one or more of the request or the response.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
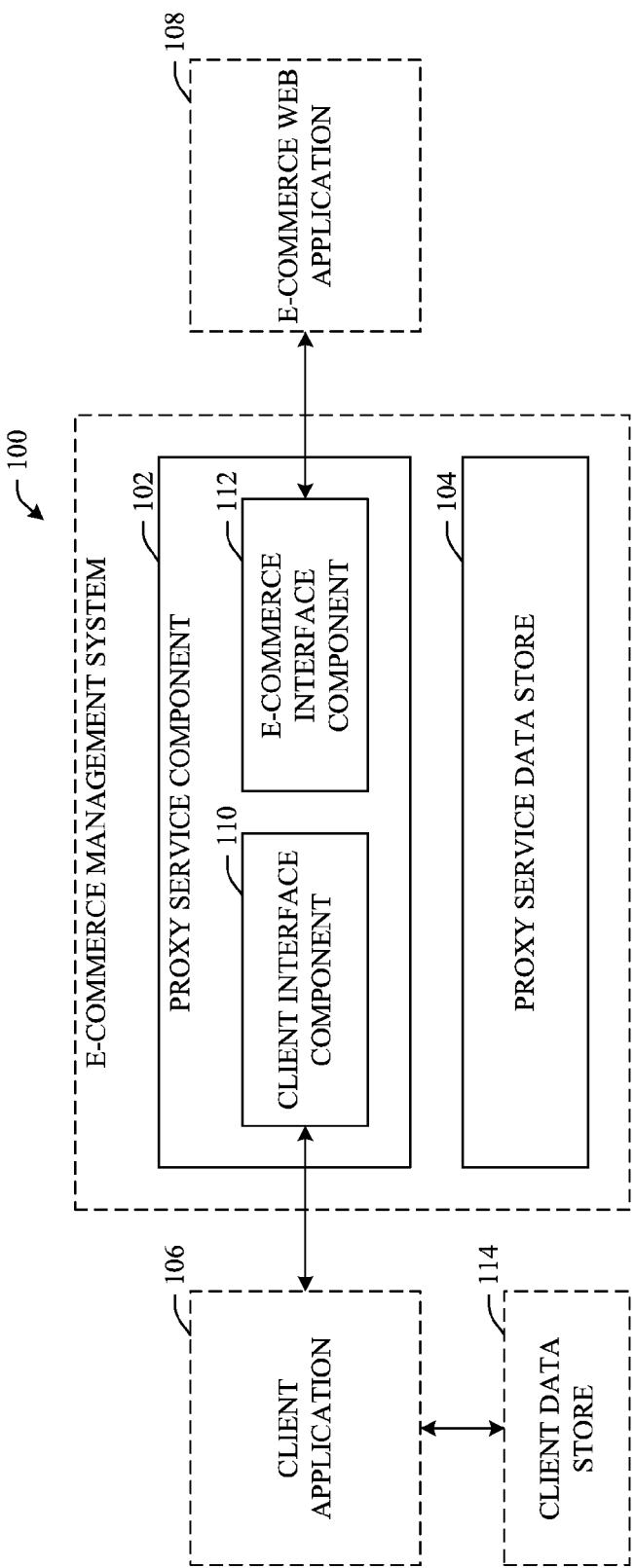
FIG. 1 illustrates an example architecture of an e-Commerce Management System in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Generally, the subject innovation relates to securely transporting information to and from an electronic commerce system. The subject innovation can provide an e-Commerce solution that efficiently and cost effectively facilitates product querying and online ordering from an existing e-Commerce Web Application in other consumer driven applications without jeopardizing PCI DSS rules and regulations.

In aspects, systems and methods of the subject innovation can provide a Proxy Service that can adhere to Payment Card Industry Data Security Standard (PCI DSS) rules and regulations and can communicate with a Secure Socket Layer (SSL) encrypted electronic commerce (e-Commerce) Web Application on behalf of a Client Application. As used herein, SSL is intended to also encompass related protocols, such as Transport Layer Security. The Proxy Service can organize data received from the e-Commerce Web Application into a serialized data object. Any organized data that is disallowed for transport in this context, according to PCI DSS rules and regulations, can be encrypted with a cipher (e.g., 256-bit, etc.) before responding to the Client Application. The Client Application, which does not have the salt key, can relay the encrypted data back to the Proxy Service but cannot decrypt or make use of the encrypted data itself. The Proxy Service, which does have the original salt key, can decrypt and once again make use of the encrypted data.

In accordance with the innovation, FIG. 1 illustrates an example architecture of an e-Commerce Management System 100 in accordance with aspects of the innovation. Generally, the system 100 can include a Proxy Service Component 102 and a Proxy Service data store 104 that can enable an e-commerce transaction between a Client Application 106 and an e-Commerce Web Application 108 by facilitating secure e-commerce data transfer, e.g., via the Internet. In aspects, Proxy Service Component 102 can provide a PCI DSS compliant Proxy Service that can be used to facilitate the secure transport of product and transaction data from an existing e-Commerce Web Application 108 (e.g., an existing web-based merchant interface, etc.) to and/or from a Client Application 106, which is the environment that will interface with a customer (which can be any of a variety of Client Applications, such as different browsers, mobile applications, etc.).

Proxy Service Component 102 can manage two sessions for every transaction. Proxy component 102 can communicate with Client Application 106 via a client interface component 110 that can manage the session with Client Application 106 (e.g., receiving requests from the client application, translating responses to a format appropriate for the client application, sending the translated response to the client application, etc.). In the session with Client Application 106, some information can be stored by the Proxy Service Component 102 at the Proxy Service data store 104 (e.g., non-sensitive information), some information can be sent to the Client Application 106 (e.g., non-sensitive information, and some sensitive information after being encrypted, etc.) to be stored at a client data store 114, and some information can be stored at both, as described further herein. Additionally, proxy component 102 can communicate with e-Commerce Web Application 108 via an e-commerce interface component 112 that can manage the session with e-Commerce Web Application 108 (e.g., translating requests to a format appropriate for the e-Commerce Web Application, sending requests to the e-Commerce Web Application, receiving responses from the e-Commerce Web Application, etc.). In aspects, the session with e-Commerce Web Application 108 can be implemented by proxy component 102 (e.g., by way of e-commerce interface component 112) via an Application Programming Interface (API) tailored specifically to the e-Commerce Web Application 108. In various embodiments, Proxy Service 102 can enables a Programmer to create an API to communicate with the e-Commerce Web Application 108. In some aspects, all web-based communications interacting with the Proxy Service Component 102 can take place via Programmer implemented APIs. A Programmer can utilize the Proxy Service Component 102 to interpret an e-Commerce Web Application 108 and can translate it into a set of API functions specific to the e-Commerce Web Application 108. These API functions can allow multiple Client Applications 106 to interface with the e-Commerce Web Application 108 across SSL, via Proxy Service Component 102.

According to one aspect of the invention, every transaction that takes place via the Proxy Service Component 102 can strictly adhere to the guidelines set forth by the PCI Security Standards Council for e-commerce transactions, the Payment Card Industry Data Security Standard (PCI DSS). In such aspects, all web-based communications interacting with the Proxy Service 102 can take place over SSL. All sessions with e-Commerce Web Application 108 can be isolated and abstracted from the Client Application 106 to prevent (or alleviate) man-in-the-middle attacks. The Proxy Service Component 102 need not save data related to credit card holder information on any data storage device including, but not limited to, local hard drives, network mounted hard drives, database applications, or removable media, any or all of which are intended to be encompassed within Proxy Service data store 104. In the event that data must be maintained between proxied actions, it can be encrypted by Proxy Service Component 102 and sent to the Client Application 106 to be stored in client data store 114 for later use as substantially any local data storage mechanism accessible to the Client Application (e.g. cookie, local shared object, javascript object, etc). The Client Application 106 can return the encrypted data back to the Proxy Service 102 on a subsequent request, where it can then be decrypted and re-used. In various aspects, Client Application 106 is not provided the salt key to decrypt the encrypted data stored in client data store 114.

Figure 2:
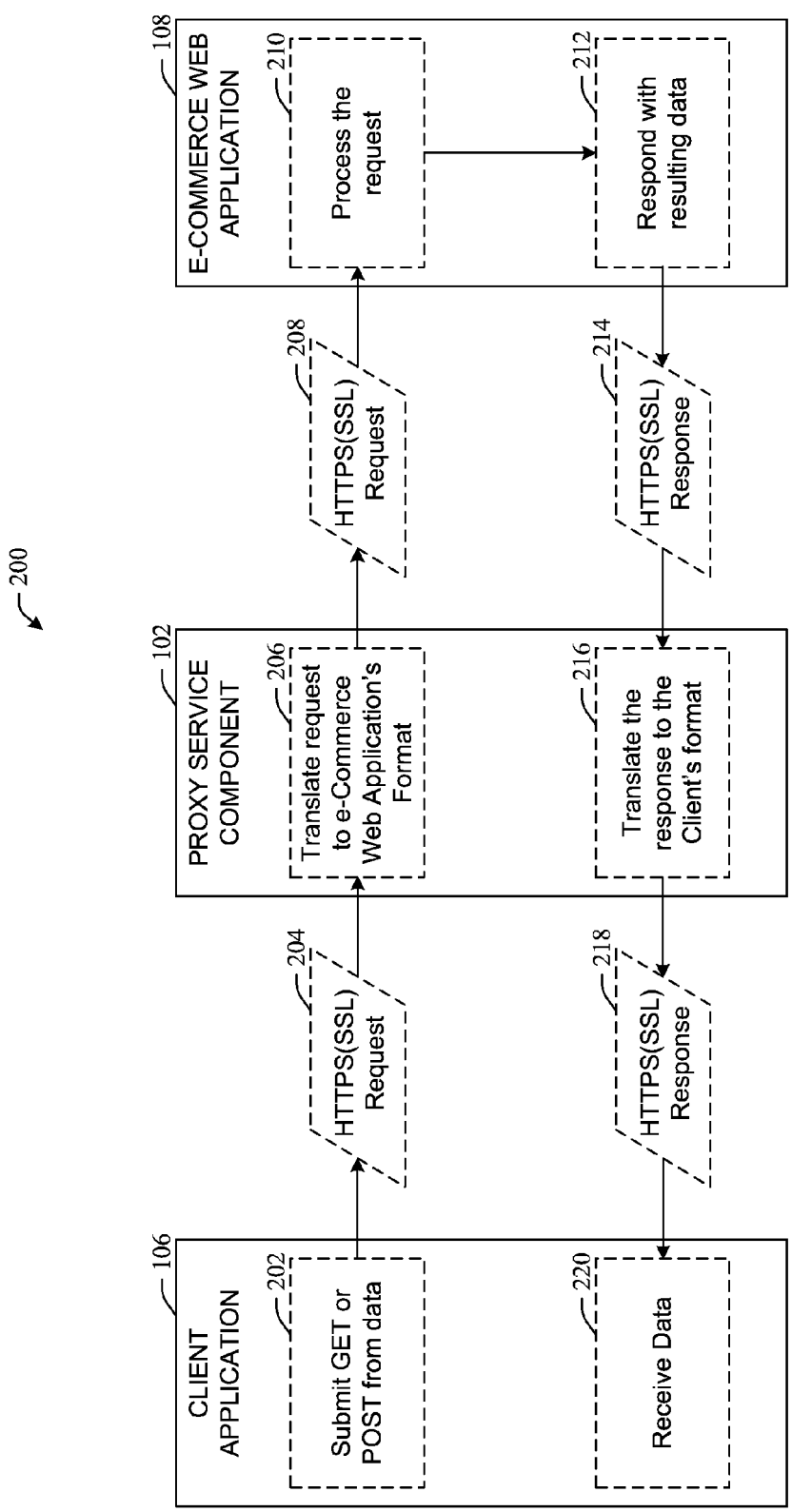
FIG. 2 illustrates an example workflow of an e-commerce transaction in accordance with aspects of the innovation.

FIG. 2 illustrates an example workflow or method 200 of an e-commerce transaction in accordance with aspects of the innovation. While, for purposes of simplicity of explanation, the one or more methodologies shown herein, e.g., in the form of a flow chart or workflow diagram, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Workflow 200 can begin at 202, wherein the Client Application 106 can submit an HTTPS request (e.g., GET or POST form data, PUT, DELETE, etc.) at 202. This can be transmitted at 204 as an HTTPS (hypertext transfer protocol with SSL) request to Proxy Service Component 102. After receiving the request, at 206 Proxy Service Component 102 can translate the request to a format appropriate for e-Commerce Web Application 108, which will depend on aspects of e-Commerce Web Application 108, and can be based on an API developed to work specifically with e-Commerce Web Application 108, as explained herein. At 208, the translated request can be sent via SSL by Proxy Service Component 102 to e-Commerce Web Application 108. E-Commerce Web Application 108 can process the request at 210, and respond with the resulting data at 212, which will depend on the nature of the request and the specifics e-Commerce Web Application 108 (e.g., whether a product is being selected, payment information is being provided, etc.). At 214, the response can be sent via SSL from e-Commerce Web Application 108 to Proxy Service Component 102. At 216, the received response can be translated to a format appropriate for Client Application 106. The translated response can be sent via SSL at 218 from Proxy Service Component 102 to Client Application 106. At 220, Client Application 106 can receive the response, which can be presented to a client interacting with Client Application 106.

From the standpoint of Proxy Service Component 102, the flow of FIG. 2 can be substantially as follows. An HTTPS request can be received at 204, translated to a format appropriate for e-Commerce Web Application 108 at 206, and the translated request can be sent via SSL at 208. The workflow can continue for the Proxy Service Component 102 at 214, where an HTTPS response is received. The response can be translated at 216 to a format appropriate for Client Application 106, and the translated response can be sent via SSL at 218. In aspects, communications with Client Application 106 can take place via client interface component 110, while communications between Proxy Service Component 102 and e-Commerce Web Application 108 can take place via e-commerce interface component 112.

Figure 3:
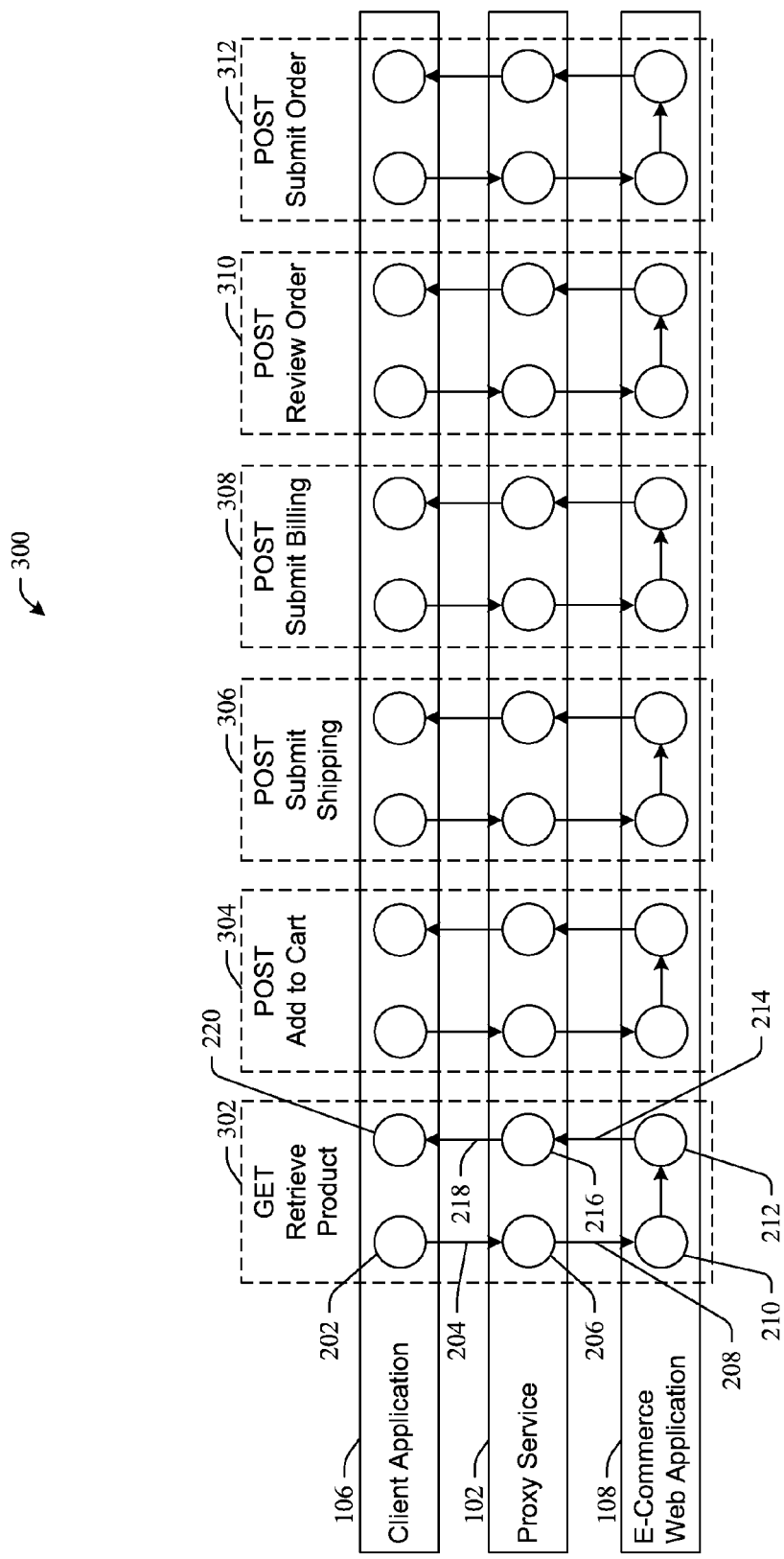
FIG. 3 shows an example API workflow of a series of transactions used in a Proxy Service API implementation.

Referring to the workflow or method of FIG. 3, according to various aspects of the innovation, the Proxy Service Component 102 can be utilized by a programmer to create an Application Programming Interface (API) tailored to a specific e-Commerce Web Application 108. In embodiments, all web-based communications interacting with the Proxy Service Component 102 can take place via Programmer-implemented APIs. In such embodiments, a Programmer can utilize the Proxy Service Component 102 to interpret an e-Commerce Web Application 108 and can translate it into a set of API functions specific to the e-Commerce Web Application 108. These API functions can allow multiple Client Applications to interface with the same e-Commerce Web Application 108 across SSL.

With continued reference to FIG. 3, an example API workflow or method 300 of a series of transactions used in a Proxy Service API implementation is shown. It is to be understood that the specific acts shown are merely examples, and that in connection with various e-Commerce Web Applications 108, additional or alternative acts may take place that can also be implemented via an API created via Proxy Service Component 102. Also, it is to be understood that Client Application 102 is responsible for making requests to the Proxy Service 102 in a meaningful sequence, and this sequence of actions (e.g., actions 302-312) can differ from one implementation to the next. Actions 302-312 are only one such sequence of actions.

The example workflow 300 can include the following acts. At 302, Client Application 106 can retrieve product information from the e-Commerce Website Application 108 via the Proxy Service 102. This retrieval of product information can be via an HTTP and/or HTTPS GET request, and can proceed according to a workflow such as workflow 200 described in connection with FIG. 2, encompassing steps 202-220. The retrieval of product information via HTTP GET in this instance (as opposed to HTTPS) can remain compliant with PCI DSS in instances when a stateless (e.g. anonymous) request can be made to the e-Commerce Website Application 108. Next, at 304, the Client Application 106 can add a product to a shopping cart on the e-Commerce Website Application 108 via the Proxy Service 102 using proxy data. As with action 302, action 304 (as well as actions 306-312) can proceed according to workflow 200 of FIG. 2; however, for ease of illustration, specific steps of workflow 200 are only indicated in connection with action 302. At 306, Client Application 106 can submit shipping information to the e-Commerce Website Application 108 via the Proxy Service 102 using proxy data, and at 308, the Client Application 106 can submit billing information to the e-Commerce Website Application 108 via the Proxy Service 102 using proxy data. Next, at 310, Client Application 106 can submit a request to review order information from the e-Commerce Website Application 108 via the Proxy Service 102 using proxy data. Finally, at 312, Client Application 106 can submit the current order to the e-Commerce Website Application 108 via the Proxy Service 102 using proxy data. Again, as is to be understood, the specific sequence of actions will depend upon requests made via the Client Application 106, and may also depend on the specific nature of e-Commerce Web Application 108 (which could provide for or necessitate additional or alternative actions, etc.).

Figure 4:
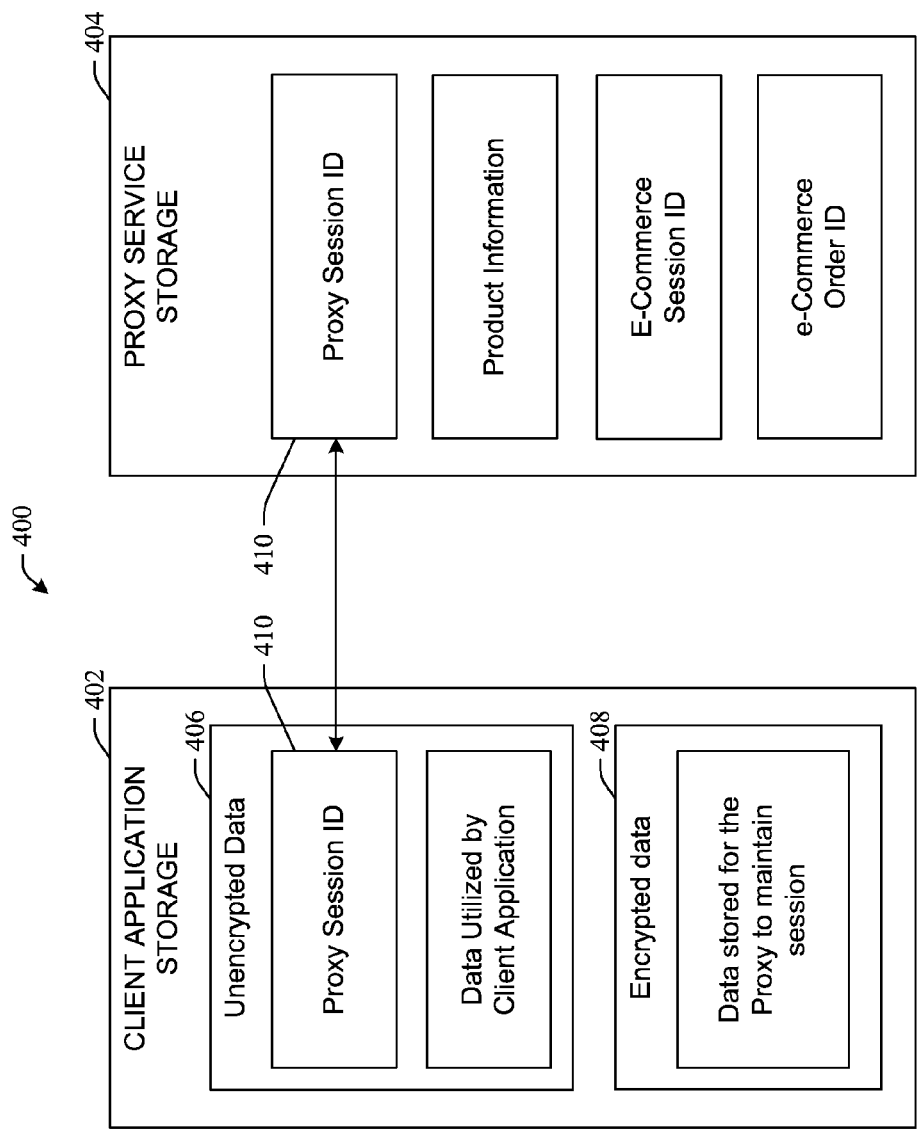
FIG. 4 illustrates two types of data storage that can be used by a Proxy Service in accordance with aspects of the innovation.

FIG. 4 illustrates two types of data storage 400 that can be used by Proxy Service 102, client application storage 402 (e.g., client application data store 114, etc.) and proxy service storage 404 (e.g., proxy service data store 104, etc.). Client application storage can include both unencrypted data 406 and encrypted data 408. In various aspects, the only piece of data that is consistently shared between the two data stores is the Proxy Service generated session ID 410, that can be used for Proxy Service Component 102 to communicate with Client Application 106, for example, via client interface component 110. Any data that is required across programmed workflow actions, but that is deemed too sensitive for typical hard drive storage, according to PCI DSS, can be encrypted with a 256-bit cipher using a private salt key, and sent to the Client Application 106 as an encrypted serialized data hash to be relayed between transactions. Because the Proxy Service 102 is the owner of the original salt key (which is not provided to client application 106), the Proxy Service 102 can decrypt and re-use data stored within the encrypted serialized data hash. Any data that is required across programmed workflow actions that is not deemed as sensitive information, according to PCI DSS, can be sent to the Client Application 106 as plain text to be relayed between transactions, and may optionally be stored in a local database accessible to the Proxy Service 102. Examples of such non-sensitive data may include, but is not limited to, Proxy Session ID 410, e-Commerce Web Application Session ID, Product Title, Product Description, Product Price, and e-Commerce Web Application Order ID.

Figure 5:
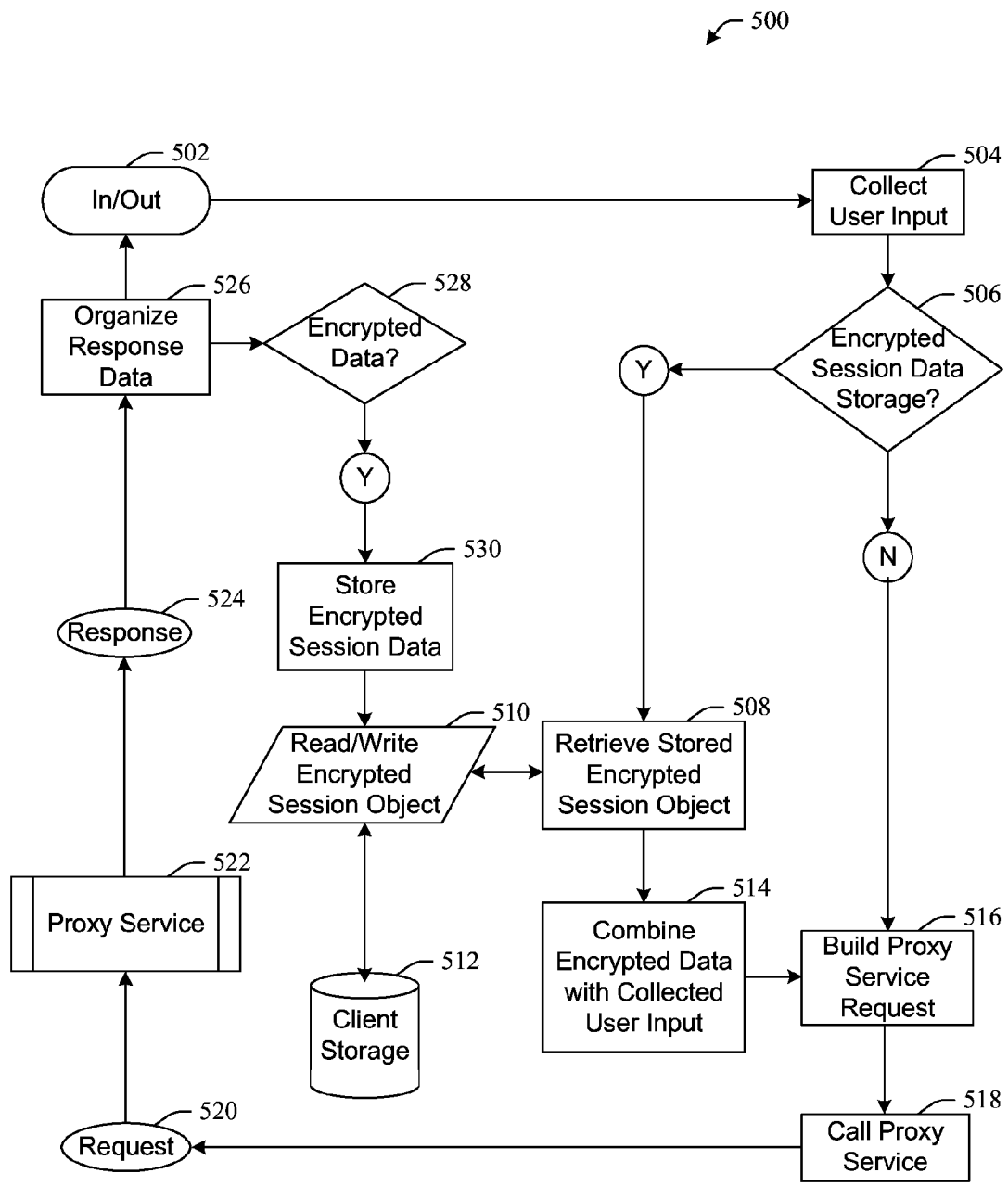
FIG. 5 illustrates an example embodiment of a data workflow that can be performed by a Client Application as it interacts with a Proxy Service.

In accordance with aspects of the innovation, FIG. 5 illustrates an embodiment of a data workflow or method 500 that can be performed by Client Application 106 as it interacts with Proxy Service 102. Workflow 500 can begin at 502, and proceed to step 504, wherein user input data can be collected (e.g., selecting a product, submitting billing or shipping information, etc.). Next, at step 506, Client Application 106 can determine if any previously collected encrypted session data was stored or not. If it was, the workflow can proceed to 508, where the Client Application 106 can retrieve the stored session object, for example, by reading the encrypted session object at 510 from client storage 512 (e.g., client data store 114, etc.). Then, at 514, the encrypted data can be combined with the collected user input. At 516, the Client Application can build a request object (e.g., GET, POST, etc.) for the intended Proxy Service 102 functionality, based on the user input (either with or without encrypted session data, depending on the determination at 506). The Client Application 106 can call the Proxy Service 102 at 518, and send the request (e.g., via HTTPS, etc.) to it at 520. At 522, the Proxy Service 102 can take any appropriate actions based on the request sent at 520, and can send a response (e.g., via HTTPS, etc.) at 524 back to the Client Application 106. At 526, the Client Application can organize the response data (e.g., generate output to a user, etc.), and at 528 can determine if the response data included encrypted data. If not, workflow 500 can end at 502 (where it can begin again if appropriate, based on user input). If the response 524 includes encrypted data (e.g., a positive determination is made at 528), then at 530, the encrypted data can be stored, by writing the encrypted session object at 510 to the client storage 512.

Figure 6:
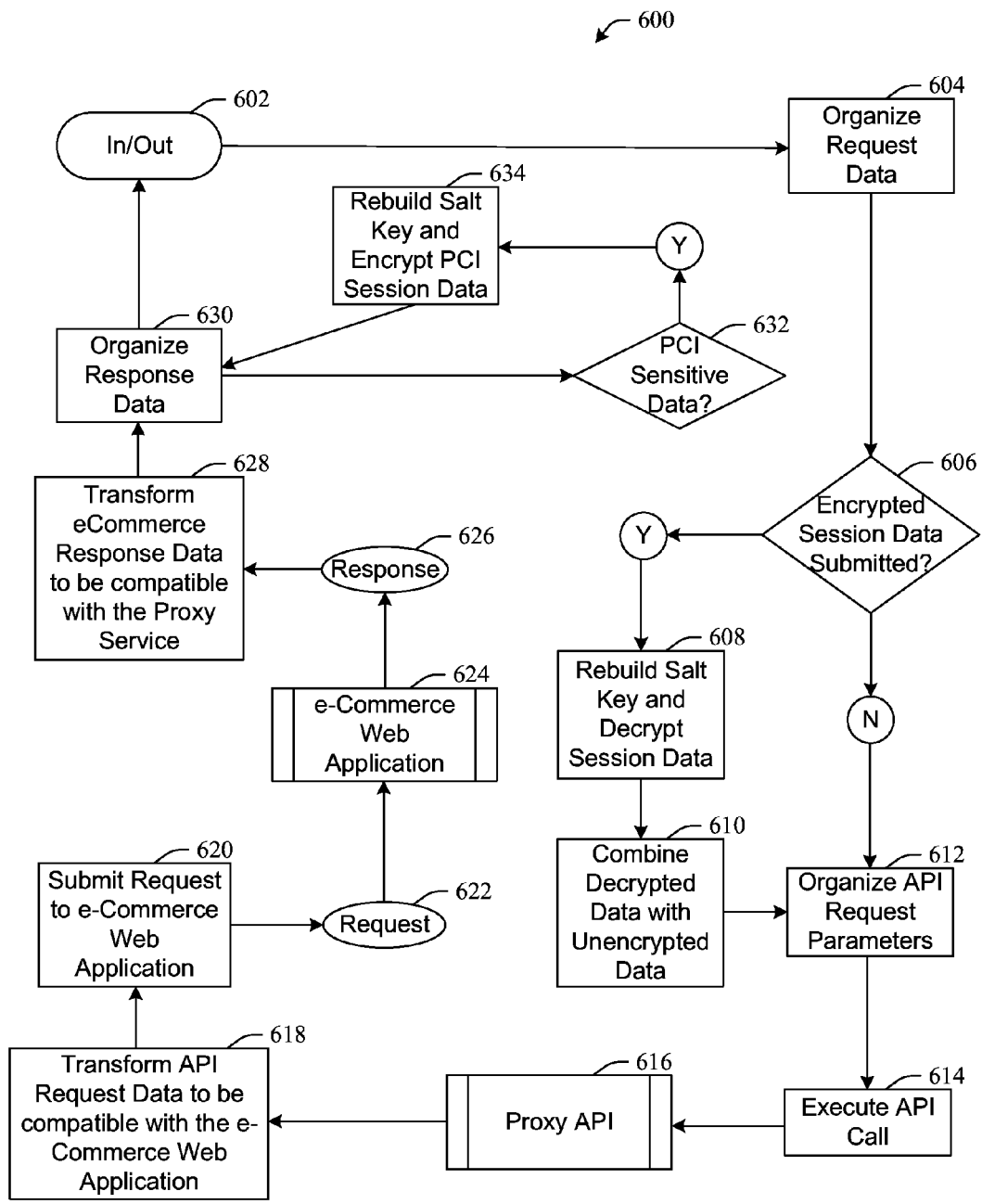
FIG. 6 illustrates an example data workflow of a proxy service upon receiving a request from a client application.

Turning to FIG. 6, illustrated is an example data workflow or method 600 of a proxy service 102 upon receiving a request (e.g., via HTTPS, etc.) from a client application 106. In aspects, workflow 600 can be implemented at step 522 of workflow 500, although it need not be. The workflow 600 can begin at 602 and proceed to 604, wherein the proxy service 102 can organize the submitted request data (e.g., of request 520, if workflow 600 is implemented in conjunction with workflow 500). Next, at 606, proxy service 102 can determine if any encrypted session data was submitted or not as part of the request. If so, the workflow 600 can proceed to step 608, where the salt key can be rebuilt and the encrypted session data can be decrypted. At 610, the decrypted data can be combined with the unencrypted data. Next, at 612, the proxy service 102 can organize the request data (e.g., either just unencrypted data, or unencrypted data combined with decrypted data if a positive determination was made at 606) into proper API request parameters. At 614, the proxy service 102 can execute the appropriate proxy API call based at least in part on the API request parameters organized at 612. Proxy API 616 (which can, in aspects, be implemented as a sub-component of proxy component 102, such as in connection with e-commerce interface component 112) can, at 618, transform the API request parameters into a format that is compatible with e-Commerce Web Application 108. At 620, the proxy component 102 (e.g., via Proxy API 616, etc.) can submit the transformed request parameters to the e-Commerce Web Application 108 as request 622. At 624, e-commerce web application 108 can perform any appropriate actions based on request 622 (e.g., process the request and respond with any resulting data, etc.), and at 626, send a response to proxy component 102. After receiving the response at 626, the Proxy API 616 at 628 can transform the response data into a format that is compatible with the Proxy Service 102. At 630, the proxy service 102 can organize the response data into an appropriate format for transmission to client application 106. This can involve a determination made at 632 whether any sensitive data (e.g., data indicated as sensitive according to PCI DSS, etc.) was returned to proxy service 102 as part of the transformed response data. If sensitive data was returned, then at 634, the proxy service can rebuild the salt key and encrypt the sensitive data. If not, or once the sensitive data has been encrypted, then a response can be generated for the client application 106 (e.g., organizing the data in an appropriate format for the client application 106, etc.) and the workflow can end at 602, with proxy service 102 returning appropriate response data to the client application 106.

Figure 7:
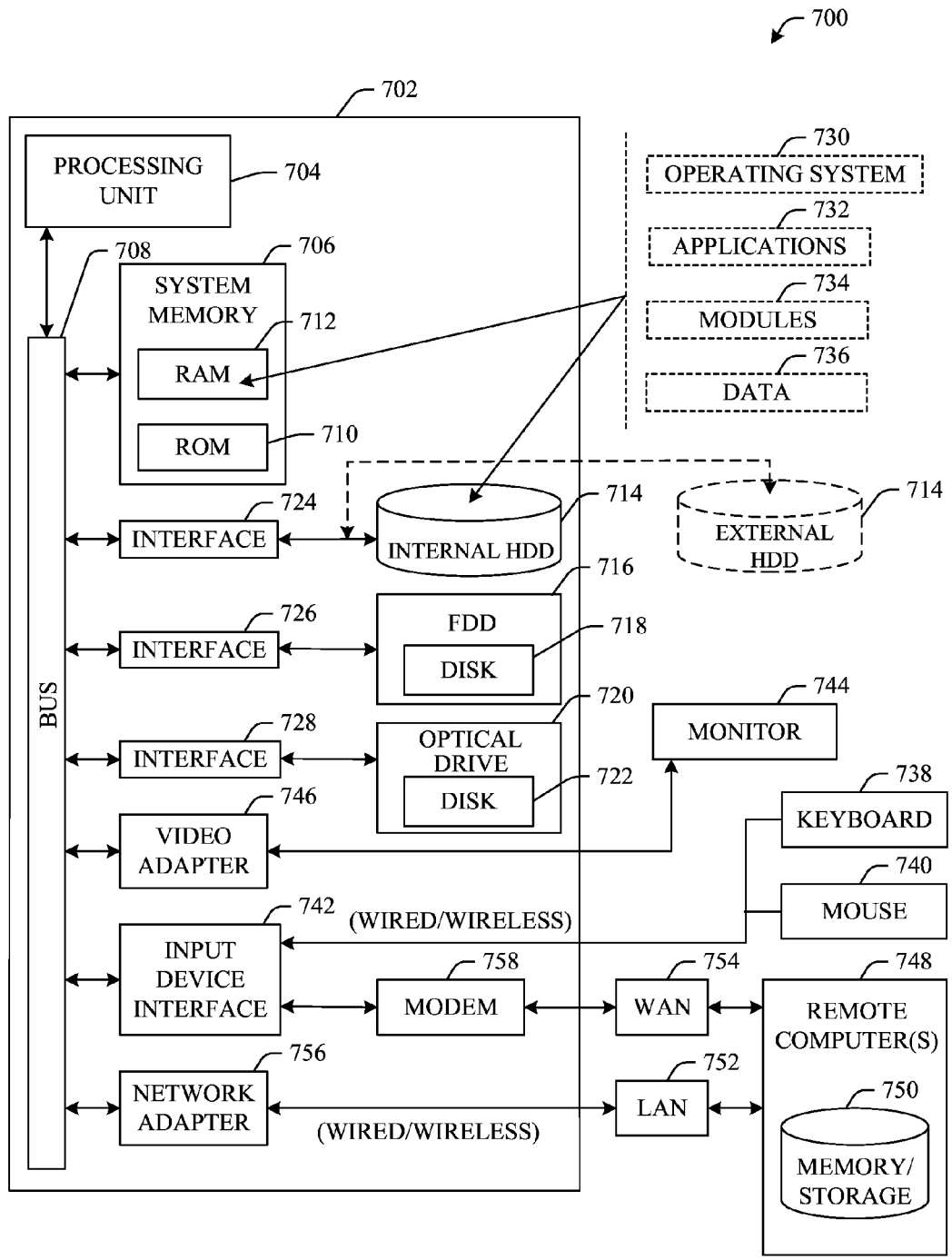
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the subject innovation, FIG. 7 and the following discussion are intended to provide a brief, general description of a suitable computing environment 700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
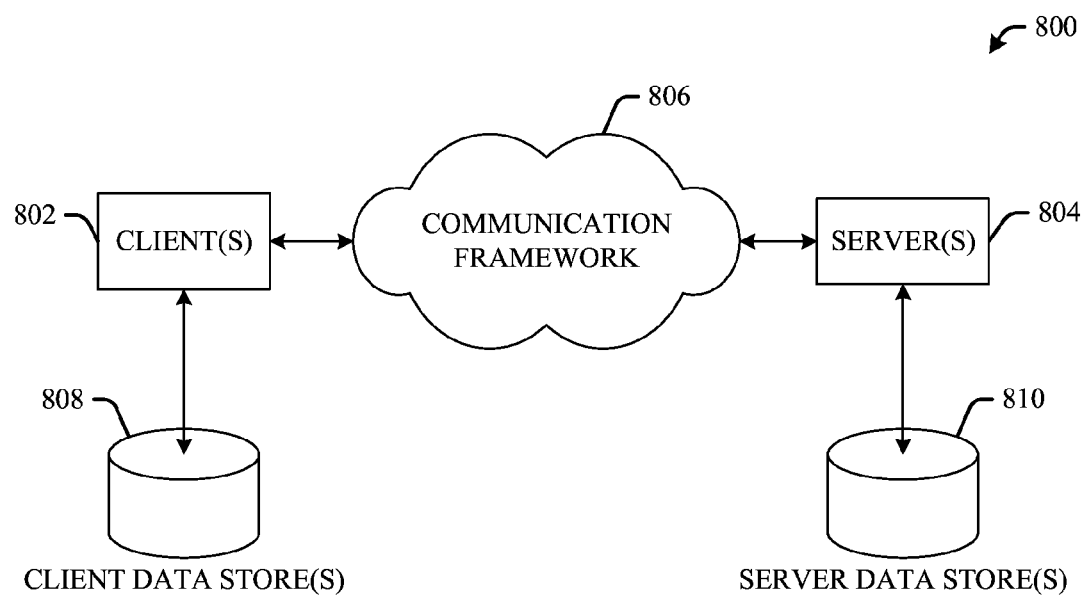
FIG. 8 illustrates a schematic block diagram of an exemplary computing environment in accordance with the subject innovation.

Referring now to FIG. 8, there is illustrated a schematic block diagram of an exemplary computing environment 800 in accordance with the subject innovation. The system 800 includes one or more client(s) 802. The client(s) 802 can be hardware and/or software (e.g., threads, processes, computing devices). The client(s) 802 can house cookie(s) and/or associated contextual information by employing the innovation, for example.

The system 800 also includes one or more server(s) 804. The server(s) 804 can also be hardware and/or software (e.g., threads, processes, computing devices). The servers 804 can house threads to perform transformations by employing the innovation, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of facilitating electronic commerce (e-commerce), comprising:
   receiving at a proxy service a hypertext transfer protocol with secure socket layer (HTTPS) request from a client application;
   translating the HTTPS request to a format appropriate for an e-commerce web application;
   sending the translated request to the e-commerce web application via HTTPS;
   receiving a response at the proxy service based at least in part on the translated HTTPS request, wherein the response includes sensitive data;
   encrypting the sensitive data with a salt key, wherein the salt key is utilized to decrypt the sensitive data at a different time;
   translating the response to a format appropriate for the client application; and
   sending the translated response including the encrypted sensitive data from the proxy service to the client application via HTTPS without storing the sensitive data at the proxy service; and
   storing the salt key at the proxy service without sending the salt key to the client application, wherein the client application neither encrypts nor decrypts the sensitive data.

2. The method of claim 1, wherein the request comprises an encrypted session object.

3. The method of claim 2, further comprising:
   rebuilding the salt key associated with the encrypted session object; and
   decrypting the encrypted session object based at least in part on the rebuilt salt key.

4. The method of claim 1, further comprising:
   organizing the HTTPS request into proper application programming interface (API) request parameters; and
   executing an API call based at least in part on the API request parameters.

5. The method of claim 1, further comprising organizing the response data.

6. The method of claim 5, wherein organizing the response data comprises:
   receiving the response data at the client application;
   determining that the response includes encrypted data; and
   storing the encrypted data in a local data storage mechanism.

7. The method of claim 1, wherein encrypting the sensitive data with the salt key is based at least in part on using a 256-bit cypher.

8. The method of claim 1, wherein the HTTPS request is one of a GET request or a POST request.

9. The method of claim 1, further comprising complying with Payment Card Industry Data Security Standards (PCI DSS).

10. The method of claim 1, wherein accessing the client application request further comprises:
    receiving an encrypted session object from the client application;
    determining that previously collected encryption session data was stored;
    retrieving the previously collected encrypted session data; and combining the previously encrypted session data with user input data, wherein the request object comprises the previously collected encrypted session data.

11. The method of claim 1, wherein encrypting the sensitive data comprises encrypting data indicated as sensitive according to Payment Card Industry Data Security Standards (PCI DSS).

12. An e-commerce management system, comprising:
a proxy service component implemented via one or more processors that provides for secure communication between a client application and an e-commerce web application, comprising:
   a client interface component that receives a request comprising an encrypted session object from the client application, wherein the encrypted session object was previously encrypted based at least in part on a salt key,
   wherein the proxy service component rebuilds the salt key associated with the encrypted session object and decrypts the encrypted session object based at least in part on the rebuilt salt key;
   an e-commerce interface component that translates the request to a format appropriate for the e-commerce web application, sends the translated request to the ecommerce web application, and receives a response from the e-commerce web application,
   wherein the client interface component translates the response to a format appropriate for the client application and sends the translated response to the client application without transmitting the salt key or the rebuilt salt key; and
   a proxy service data store that stores non-sensitive information associated with one or more of the request or the response.

13. The system of claim 12, wherein the response and the request are sent and received via HTTPS.

14. The system of claim 13, wherein the HTTPS request is one of a GET request, a POST request, a PUT request, or a DELETE request.

15. The system of claim 12, wherein the response comprises sensitive data, and wherein the proxy service component rebuilds a salt key associated with the sensitive data and encrypts the sensitive data with the salt key.

16. The system of claim 12, wherein the e-commerce management system complies with Payment Card Industry Data Security Standards (PCI DSS).

17. The system of claim 12, wherein the request received from the client application comprises a request object comprising user input data and an encrypted session object.

18. The system of claim 12, wherein the response translated for the client application comprises a response object comprising an encrypted session object and client application requested user response data.

19. The system of claim 12, wherein the encrypted session object is stored at the client application and the encrypted session object is not stored at the proxy service data store.

20. The system of claim 12, wherein the client application does not include the salt key and the client application cannot decrypt the encrypted session object.

\* \* \* \* \*